United States Patent [19]

Kikuta et al.

[11] Patent Number: 5,053,664
[45] Date of Patent: Oct. 1, 1991

[54] MOTOR-DRIVEN FUEL PUMP

[75] Inventors: Hikaru Kikuta; Koichi Mine; Kazumichi Hanai; Kingo Kamiya; Hitoshi Takeuchi, all of Obu, Japan

[73] Assignee: Aisan Kogyo Kabushiki Kaisha, Obu, Japan

[21] Appl. No.: 454,448

[22] Filed: Dec. 21, 1989

[30] Foreign Application Priority Data

Jan. 18, 1989 [JP] Japan .................. 1-4294[U]
Jan. 19, 1989 [JP] Japan .................. 1-5371[U]
Jan. 19, 1989 [JP] Japan .................. 1-5372[U]
Jan. 25, 1989 [JP] Japan .................. 1-7169[U]

[51] Int. Cl.$^5$ .................................. H02K 16/02
[52] U.S. Cl. .................................. 310/114; 310/68 B; 310/89; 310/191; 310/156; 310/254; 318/254; 417/336; 417/423.7
[58] Field of Search ............... 310/156, 191, 112, 209, 310/114, 177, 90, 254, 157, 261, 258, 248, 68 R, 233, 68 B, 54, 68 C, 89; 318/254; 417/410, 336, 366, 423.7

[56] References Cited

U.S. PATENT DOCUMENTS

| 4,385,276 | 5/1983 | Bitzel | 310/68 R |
| 4,493,620 | 1/1985 | Takei | 417/366 |
| 4,573,882 | 3/1986 | Watanabe | 417/366 |
| 4,778,354 | 10/1988 | Idei | 417/366 |
| 4,784,587 | 11/1988 | Takei | 417/423.1 |
| 4,955,790 | 9/1990 | Nakanishi | 310/68 C |

FOREIGN PATENT DOCUMENTS 62-172272 10/1987 Japan .

Primary Examiner—R. Skudy
Attorney, Agent, or Firm—Dennison, Meserole, Pollack and Scheiner

[57] ABSTRACT

A motor-driven fuel pump including a brushless motor; a motor housing for enclosing the brushless motor; and a pump section adapted to be driven by the brushless motor for sucking a fuel and pumping the same into the motor housing. The brushless motor includes a stator fixed to an inner circumference of the motor housing; a rotor assembly adapted to be rotated by supplying current to the stator, which rotor assembly includes a motor shaft, a rotor mounted to the motor shaft a rotor cover mounted to one end of the rotor magnet on the side of the pump section, a timing rotor mounted to the other end of the rotor magnet, and a sensor magnet mounted to an end of the timing rotor on the side opposite to the rotor magnet; an end cover mounted at an inlet end of the brushless motor; a motor shaft bearing mounted in the end cover for rotatably supporting the motor shaft; and a timing rotor bearing interposed between an outer circumference of the timing rotor and the inner circumference of the motor housing for rotatably supporting the timing rotor.

16 Claims, 15 Drawing Sheets

MOTOR-DRIVEN FUEL PUMP

BACKGROUND OF THE INVENTION

The present invention relates to a motor-driven fuel pump for pumping a fuel to an automotive engine, for example.

In a motor-driven fuel pump adapted to be disposed in a fuel tank for an automobile, for example, for pumping a fuel to an engine of the automobile, there has been employed a brushless motor suitable for high-speed rotation of a rotor under a high pressure of the fuel to be supplied (e.g., Japanese Utility Model Laid-open Publication No. 62-172272).

However, there is a problem of generation of a noise due to vibration caused by dynamic unbalance of the rotor. The dynamic unbalance of the rotor is caused by insufficient adjustment of dynamic balance of a rotor magnet mounted on a motor shaft since the rotor magnet has no portion to be cut out for the purpose of adjustment of the dynamic balance.

A sensor magnet for detecting a magnetic pole position is mounted to the rotor magnet with set screw after the rotor magnet adjusted in dynamic balance is mounted through a bearing to a motor housing. Accordingly, if the sensor magnet is eccentrically mounted to the rotor magnet to cause dynamic unbalance, the rotor magnet adjusted in dynamic balance generates dynamic unbalance because of the eccentricity of the sensor magnet.

FIG. 6 shows the relationship between a dynamic unbalance quantity of the rotor magnet and a noise in an automotive compartment in case of rotating the motor in the fuel pump at a speed of 4800 r.p.m. As apparent from FIG. 6, the noise increases linearly with an increase in the dynamic unbalance quantity.

In another structure of the brushless motor having a rotor assembly of the rotor magnet with the sensor magnet supported through a rotor bearing to the motor housing, the rotor bearing for supporting the outer circumference of the rotor assembly has a diameter larger (e.g., five times) than a motor shaft bearing for supporting the motor shaft. Accordingly, a peripheral speed of the bearing surface of the rotor assembly slidingly contacting the inner circumference of the rotor bearing becomes relatively high, causing an increase in frictional heat to be generated from the bearing surface. As a result, the rotor bearing is thermally expanded to cause a reduction in strength of the rotor bearing as well as damage of the motor shaft.

In such a motor-driven pump, the fuel discharged from the pump section into the motor housing is allowed to flow between the inner circumference of the motor housing and the outer circumference of a control circuit case fixedly mounted in the motor housing in opposed relationship to the sensor magnet. The fuel flowing at the outer circumference of the control circuit case functions to cool a control circuit in the control circuit case, e.g., a driving transistor in which a large current flows to cause large heat generation. However, the control circuit case cannot be sufficiently cooled by the fuel since it passes at the outer circumference of the control circuit case. In particular, when temperature of the fuel becomes high, fuel vapor is generated to stay on the outer surface of the control circuit case opposed to the sensor magnet, causing a reduction in cooling efficiency of the control circuit case.

Further, this type of motor-driven pump is vertically mounted in the fuel tank in such a manner that the motor shaft extends in a direction of a gravitational force. The rotor fixedly mounted on the motor shaft (which rotor corresponds to a rotor magnet in a brushless motor or a core in a brush D.C. motor, for example) is disposed in a vertically symmetrical relationship to the stator fixed to the motor housing. Accordingly, a magnetic attracting force between the rotor and the stator is applied in a direction perpendicular to the direction of the gravitational force, that is, in a horizontal direction. As a result, a weight of a rotary member including the rotor fixed to the motor shaft is applied to an upper end surface of a lower bearing for rotatably supporting the motor shaft at its lower end portion. Therefore, wearing of the upper end surface of the lower bearing during rotation of the rotor is accelerated to cause a reduction in durability of the lower bearing, resulting in a reduction in pump performance and an adverse effect to a fuel supply system due to the generation of wearing powder.

SUMMARY OF THE INVENTION

It is a first object of the present invention to provide a motor-driven fuel pump wherein dynamic balance of the rotor magnet can be adjusted even after mounting the rotor magnet to the motor shaft, thereby reducing a noise due to dynamic unbalance of the rotor magnet.

It is a second object of the present invention to provide a motor-driven fuel pump wherein dynamic balance of the rotor magnet can be reliably adjusted with no influence of unbalance of the sensor magnet due to eccentricity thereof.

It is a third object of the present invention to provide a motor-driven fuel pump wherein a frictional heat generated from the timing rotor bearing at the bearing portion of the timing rotor having a relatively large diameter causing a high peripheral speed may be reduced by the fuel to thereby suppress thermal expansion of the timing rotor bearing and prevent a reduction in strength of the bearing as well a damage of the motor shaft.

It is a fourth object of the present invention to provide a motor-driven fuel pump wherein foreign matter contained in the fuel may be prevented from entering the bearing surface of the timing rotor bearing, thereby preventing damage of the bearing and undue stoppage of the pump.

It is a fifth object of the present invention to provide a motor-driven fuel pump wherein a control circuit case enclosing a control circuit may be cooled by the fuel led to the overall outer surface of the control circuit case through a fuel passage formed through the rotor, thereby preventing overheat of the control circuit.

It is a sixth object of the present invention to provide a motor-driven fuel pump wherein fuel vapor may be prevented from staying on the outer surface of the control circuit case opposed to the rotor by the flow of the fuel led through the fuel passage to the outer surface of the control circuit case opposed to the rotor.

It is a seventh object of the present invention to provide a motor-driven fuel pump having a vertically extending motor shaft which may reduce a load to be applied from a rotor to a lower bearing for rotatably supporting the motor shaft at its lower end portion, thereby suppressing wear of the bearing and improving the durability of the bearing.

According to a first aspect of the present invention, there is provided a motor-driven fuel pump comprising a brushless motor; a motor housing for enclosing said brushless motor; and a pump section adapted to be driven by said brushless motor for sucking a fuel and pumping the same into said motor housing; said brushless motor comprising a stator fixed to an inner circumference of said motor housing; a rotor assembly adapted to be rotated by supplying current to said stator, said rotor assembly comprising a motor shaft, a rotor magnet mounted to said motor shaft, a rotor cover mounted to one end of said rotor magnet on the side of said pump section, a timing rotor mounted to the other end of said rotor magnet, and a sensor magnet mounted to an end of said timing rotor on the side opposite to said rotor magnet; an end cover mounted at an inlet end of said brushless motor; a motor shaft bearing fixedly mounted in said end cover for rotatably supporting said motor shaft; and a timing rotor bearing interposed between an outer circumference of said timing rotor and the inner circumference of said motor housing for rotatably supporting said timing rotor.

With this construction, the rotor magnet is assembled with the timing rotor, the sensor magnet and the rotor cover, and is mounted to the motor shaft to form the rotor assembly. If there is present dynamic unbalance of the rotor assembly, the outer circumference of the rotor cover and/or the outer or inner circumference of the timing rotor except a bearing portion are/is partially cut out to effect adjustment of dynamic balance of the rotor assembly.

According to a second aspect of the present invention, there is provided a motor-driven fuel pump comprising a brushless motor; a motor housing for enclosing said brushless motor; and a pump section adapted to be driven by said brushless motor for sucking a fuel and pumping the same into said motor housing; said brushless motor comprising a stator fixed to an inner circumference of said motor housing; a rotor assembly adapted to be rotated by supplying current to said stator, said rotor assembly comprising a motor shaft, a rotor magnet mounted to said motor shaft, a rotor cover mounted to one end of said rotor magnet on the side of said pump section, a timing rotor mounted to the other end of said rotor magnet, and a sensor magnet mounted to an end of said timing rotor on the side opposite to said rotor magnet; an end cover mounted at an inlet end of said brushless motor; a motor shaft bearing fixedly mounted in said end cover for rotatably supporting said motor shaft; and a timing rotor bearing interposed between an outer circumference of said timing rotor and the inner circumference of said motor housing for rotatably supporting said timing rotor; wherein said timing rotor bearing is formed at its inner circumference with a plurality of axially extending fuel channels for communicating the fuel therethrough in said motor housing, whereby a frictional heat generated from said timing rotor bearing is reduced by the fuel flowing in said fuel channels.

With this construction, the fuel in the motor housing is allowed to flow in the fuel channels formed on the inner circumference of the timing rotor bearing slidingly contacting the bearing surface of the timing rotor. Accordingly, a frictional heat generated on the sliding contact surface between the bearing and the timing rotor is released by the fuel flowing in the fuel channels. That is, the sliding contact surface between the bearing and the timing rotor is cooled by the fuel flowing in the fuel channels to thereby suppress thermal expansion of the bearing.

According to a third aspect of the present invention, there is provided a motor-driven fuel pump comprising a brushless motor; a motor housing for enclosing said brushless motor; a pump section adapted to be driven by said brushless motor for sucking a fuel and pumping the same into said motor housing; said brushless motor comprising a stator fixed to an inner circumference of said motor housing; a rotor assembly adapted to be rotated by supplying current to said stator, said rotor assembly comprising a motor shaft, a rotor magnet mounted to said motor shaft, a rotor cover mounted to one end of said rotor magnet on the side of said pump section, a timing rotor mounted to the other end of said rotor magnet, and a sensor magnet mounted to an end of said timing rotor on the side opposite to said rotor magnet; an end cover mounted at an inlet end of said brushless motor; a motor shaft bearing fixedly mounted in said end cover for rotatably supporting said motor shaft; and a timing rotor bearing interposed between an outer circumference of said timing rotor and the inner circumference of said motor housing for rotatably supporting said timing rotor; a control circuit case for enclosing a control circuit for detecting a magnetic field to be generated by said sensor magnet and controlling supply of current to said stator, said control circuit case being fixedly disposed in said motor housing in the vicinity of and in opposed relationship to said sensor magnet; and a fuel passage formed through said rotor assembly in such a manner as to lead the fuel to an outer surface of said control circuit case opposed to said sensor magnet, whereby said control circuit case is cooled by the fuel fed through said fuel passage.

With this construction, the fuel discharged from the pump section into the motor housing is allowed to flow through the fuel passage formed in the rotor assembly and be led to the outer surface of the control circuit case opposed to the rotor assembly. Accordingly, the control circuit case is sufficiently cooled by the fuel fed through the fuel passage, and the fuel vapor intending to stay on the outer surface of the control circuit case opposed to the rotor assembly can be suppressed by the flow of the fuel to be led to the outer surface, thereby improving a cooling efficiency of the control circuit case.

According to a fourth aspect of the present invention, there is provided a motor-driven fuel pump comprising a motor housing; a motor section having a motor shaft extending in a direction of gravity, a rotor fixedly mounted on said motor shaft and a stator fixed to an inner circumference of said motor housing; a pump section adapted to be driven by said motor section for sucking a fuel and pumping the same into said motor section; and upper and lower bearings for rotatably supporting said rotor at its upper and lower end portions; wherein an outer circumferential surface of said rotor is opposed to an inner circumferential surface of said stator, and a lower end of the outer circumferential surface of said rotor is positioned at a level lower than a lower end of the inner circumferential surface of said stator, so that said rotor is upwardly attracted by a magnetic attracting force generated between said rotor and said stator to reduce a load to be applied from said rotor to said lower bearing.

With this construction, the load to be applied from the rotor to the lower bearing is reduced by the upward attraction force due to the magnetic attracting force generated between the rotor and the stator. Accordingly, wearing of the upper end surface of the lower bearing may be greatly reduced, thereby preventing a reduction in durability of the lower bearing and an adverse effect due to wearing powder. Resultantly, the durability of the pump may be improved.

The invention will be more fully understood from the following detailed description and appended claims when taken with the drawings.

DETAILED DESCRIPTION OF THE PREFERRED EMBODIMENTS

Figure 1:
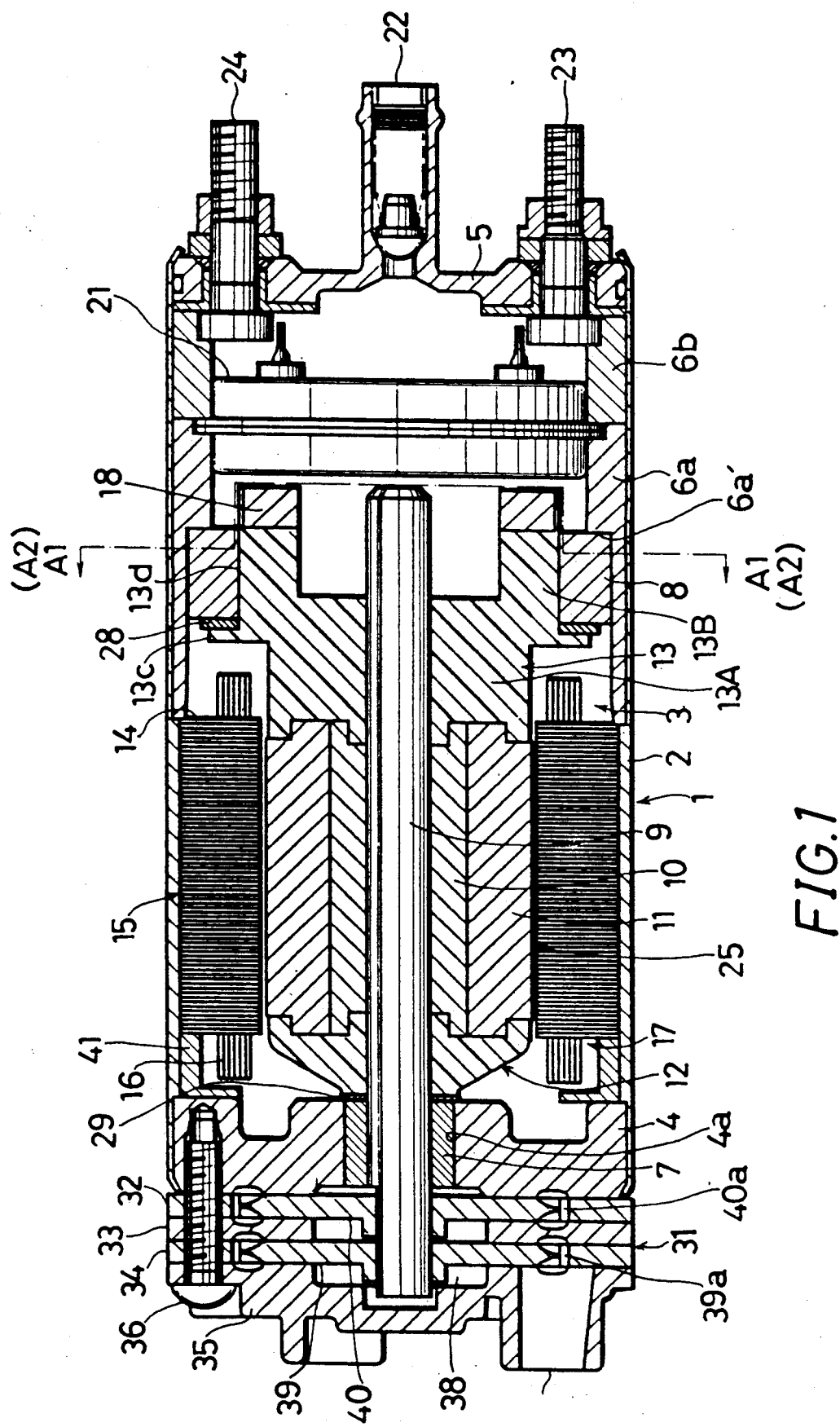
FIG. 1 is a vertical sectional view of a first preferred embodiment of the motor-driven fuel pump according to the present invention.
Figure 2:
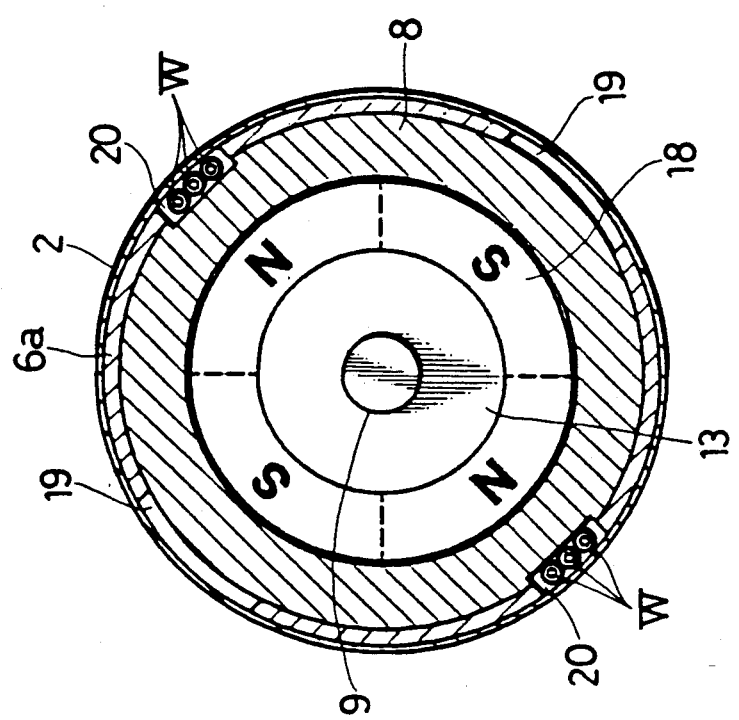
FIG. 2 is a cross section taken along the line A1—A1 in FIG. 1.

Referring to FIGS. 1 and 2, reference numeral 1 generally designates a motor section enclosed in a cylindrical motor housing 2. The motor section 1 is comprised of a brushless motor 3 concentrically mounted in the motor housing 2. An inlet pump cover 4 and an outlet pump cover 5 are fixed to opposite ends of the motor housing 2. A first case holder 6a and a second case holder 6b for holding a control circuit case 21 which will be hereinafter described are mounted on an inner circumferential surface of the motor housing 2 in the vicinity of the outlet pump cover 5. The first and second case holders 6a and 6b are engaged with each other to fix the control circuit case 21 therebetween. The first case holder 6a is formed with a shoulder 6a' for mounting a timing rotor bearing 8 which will be hereinafter described.

The inlet pump cover 4 is formed with a central hole 4a into which a motor shaft bearing 7 for rotatably supporting a motor shaft 9 is fixedly inserted. A cylindrical rotor magnet 11 is mounted through a cylindrical collar 10 to the motor shaft 9. A rotor cover 12 formed of a non-magnetic material is also mounted on the motor shaft 9 and engaged with end surfaces of the rotor magnet 11 and the collar 10 on the side opposed to the inlet pump cover 4. A timing rotor 13 formed of a non-magnetic material is also mounted on the motor shaft 9 and engaged with the other end surfaces of the rotor magnet 11 and the collar 10 on the opposite side of the inlet pump cover 4, that is, on the side opposed to the control circuit case 21.

The timing rotor 13 is comprised of a small-diameter portion 13A, a large-diameter portion 13B, and an outer flange 13c. The large-diameter portion 13B is formed on its outer circumference with a bearing surface 13d so that the timing rotor bearing 8 is interposed between the bearing surface 13d of the large-diameter portion 13B of the timing rotor 13 and the inner circumferential surface of the motor housing 2. A ring-like shim 28 is fitted on the outer circumference of the large-diameter portion 13B so as to abut against the outer flange 13c of the timing rotor 13. Thus, the timing rotor bearing 8 is axially fixed between the outer flange 13c through the shim 28 and shoulder 6a' of the case holder 6a. Another ring-like shim 29 is fitted on the motor shaft 9 so as to be interposed between the motor shaft bearing 7 and the rotor cover 12. Thus, the rotor magnet 11 is axially fixed so that axial slippage thereof may be restricted. A ring-like sensor magnet 18 is fixed to an end surface of the large-diameter portion 13B of the timing rotor 13 along the outer circumference of the large-diameter portion 13B.

Reference numeral 17 generally designates a stator comprised of a plurality of stator plates 15 stacked and coils 16 wound around the stacked stator plates 15. The stator 17 is fixed on the inner circumferential surface of the motor housing 2 in opposed relationship to the rotor magnet 11. A cup-like guide member 41 having a central opening is interposed between the inlet pump cover 4 and one end of the stator 17, so as to axially fix the stator 17.

The control circuit case 21 is located between the sensor magnet 18 and the outlet pump cover 5, and is fixed by the case holders 6a and 6b. The control circuit case 21 encloses a control circuit including a Hall device for detecting a change in magnetic field to be generated by the sensor magnet 18 and a driving transistor for controlling a driving current to be supplied to the stator coils 16, so that the rotor magnet may be rotated under the control by the control circuit.

The outlet pump cover 5 is formed at its central portion with a discharge outlet 22, and is provided with terminals 23 and 24 to be connected to a power source. As shown in FIG. 2, the case holders 6a and 6b are partially formed with a plurality of axially extending fuel passages 19 to be communicated to the discharge outlet 22, and are also partially formed with a plurality of wire recesses 20 for inserting a plurality of coil wires W of the stator 17 and leading to the terminals 23 and 24.

Reference numeral 31 generally designates a pump section mounted to the outside surface of the inlet pump cover 4. More specifically, a first spacer 32, a center plate 33, a second spacer 34 and a pump body 35 are stacked, and they are fixed together to the inlet pump cover 4 by mean of screws 36. A first impeller 39 is interposed between the pump body 35 and the center plate 33 to define a first pump chamber 39a, and a second impeller 40 is interposed between the center plate 33 and the inlet pump cover 4 to define a second pump chamber 40a communicated with the first pump chamber 39a. The pump body 35 is formed with a fuel inlet 37 communicated with the first pump chamber 39a. The motor shaft 9 is inserted at its one end portion into respective central holes of the first and second impellers 39 and 40 so that the impellers 39 and 40 may be rotated by the motor shaft 9. A fuel storing or pressure balancing chamber 38 is defined at the central portion of the pump section 31.

Figure 3A:
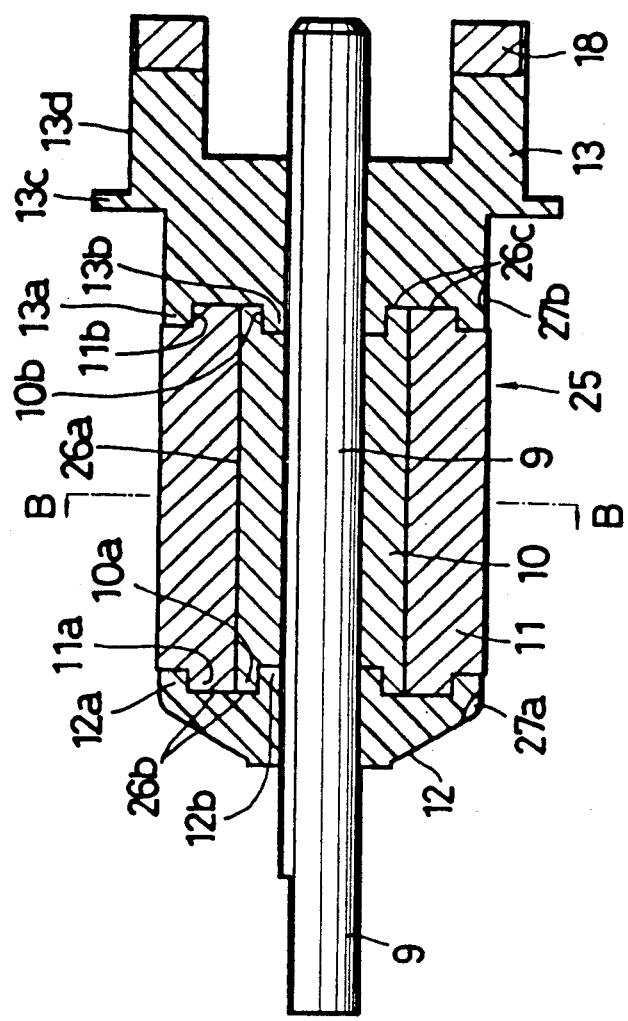
FIG. 3A is a vertical sectional view of a rotor assembly shown/in FIG. 1.

As shown in FIG. 3A, the motor shaft 9, the collar 10, the rotor magnet 11, the rotor cover 12, the timing rotor 13 and the sensor magnet 18 are fixedly assembled together to form a rotor assembly 25. The collar 10 is press-fitted with the motor shaft 9. The rotor magnet 11 is engaged on the outer circumference of the collar 10 and is bonded thereto by adhesive 26a. The rotor cover 12 and the timing rotor 13 are engaged with the opposite ends of the collar 10 and the rotor magnet 11. More specifically, the opposite ends of the rotor magnet 11 is formed at their outer circumferences with a pair of annular recesses 11a and 11b, while the rotor cover 12 is formed at its outer circumference with an annular projection 12a engaging the annular recess 11a of the rotor magnet 11, and the timing rotor 13 is formed at its outer circumference with an annular projection 13a engaging the annular recess 11b of the rotor magnet 11. Further, the opposite ends of the collar 10 is formed at their inner circumferences with a pair of annular recesses 10a and 10b, while the rotor cover 12 is formed at its inner circumference with an annular projection 12b engaging the annular recess 10a of the collar 10, and the timing rotor 13 is formed at its inner circumference with an annular projection 13b engaging the annular recess 10b of the collar 10. The rotor cover 12 and the timing rotor 13 are also press-fitted with the motor shaft 9, and they are bonded to the opposite ends of the rotor magnet 11 by adhesives 26b and 26c.

Figure 3B:
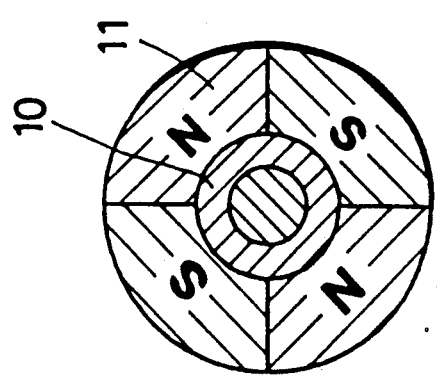
FIG. 3B is a cross section taken along the line B—B in FIG. 3A.

As shown in FIGS. 2 and 3B, the magnetic poles of the sensor magnet 18 and the rotor magnet 11 are arranged to accord with each other in phase.

If there is present dynamic unbalance in the rotor assembly 25, the outer circumference of the rotor cover 12 is cut at a position 27a, for example, and/or the outer circumference of the timing rotor 13 is cut at a position 27b, for example. Further, although not shown, the inner circumference of the large-diameter portion 13B of the timing rotor 13 may be partially cut out. So, the dynamic balance of the rotor assembly 25 is adjusted. Accordingly, even if the sensor magnet 18 is eccentrically mounted to the timing rotor 13 to cause the dynamic unbalance, such unbalance may be eliminated by cutting an appropriate part of the rotor assembly 25 before mounting the rotor assembly 25 into the motor housing 2. Thus, adjustment of dynamic balance of the rotor magnet 11 can be easily carried out to greatly reduce the dynamic unbalance and thereby greatly reduce the noise due to vibration of the rotor assembly 25.

Figure 4:
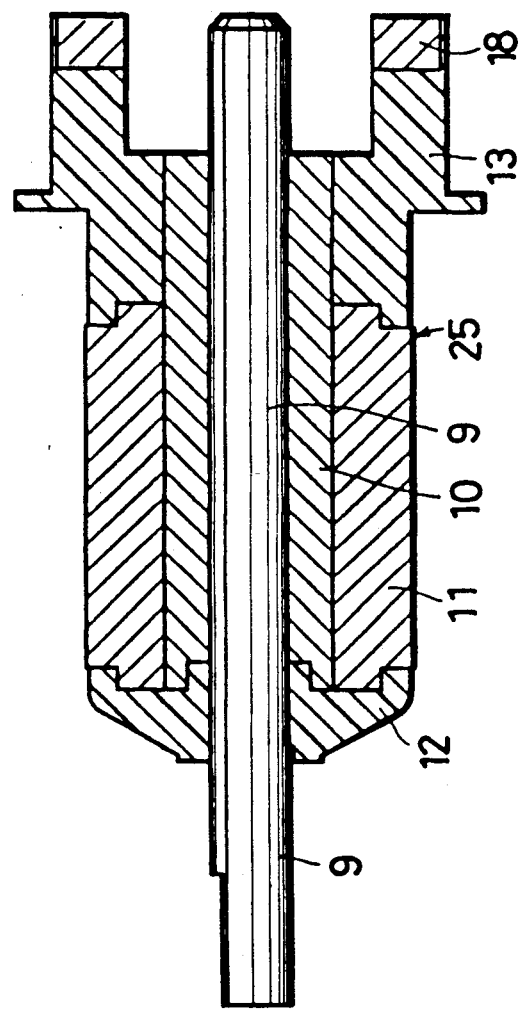
FIG. 4 is a view similar to FIG. 3A, showing a modification of the rotor assembly.

Referring to FIG. 4 which shows a modification of the rotor assembly 25, the timing rotor 13 is press-fitted with the collar 10 instead of the motor shaft 9. With this construction, substantially the same effect as the previous preferred embodiment can be exhibited, and it is more advantageous that the timing rotor 13 can be easily mounted.

Figure 5:
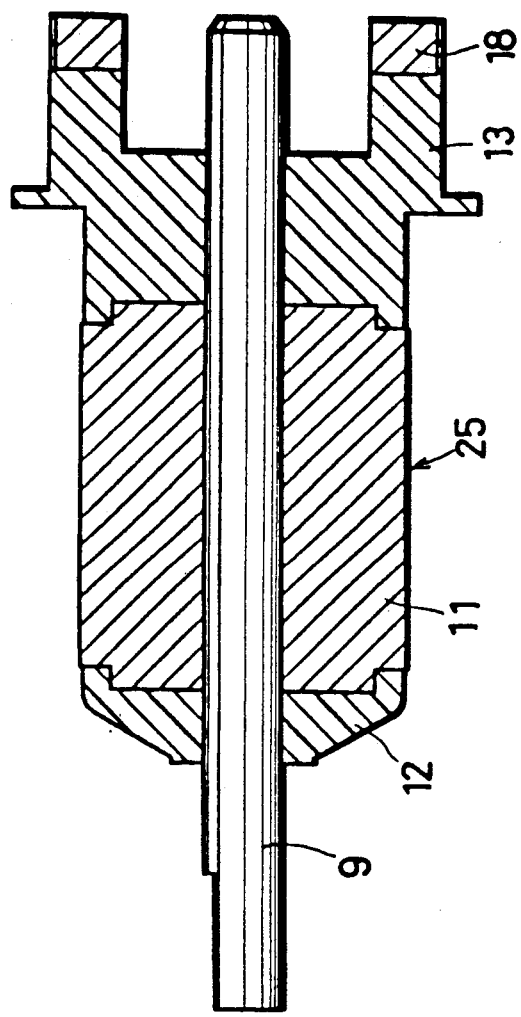
FIG. 5 is a view similar to FIG. 3A, showing a further modification of the rotor assembly.
Figure 6:
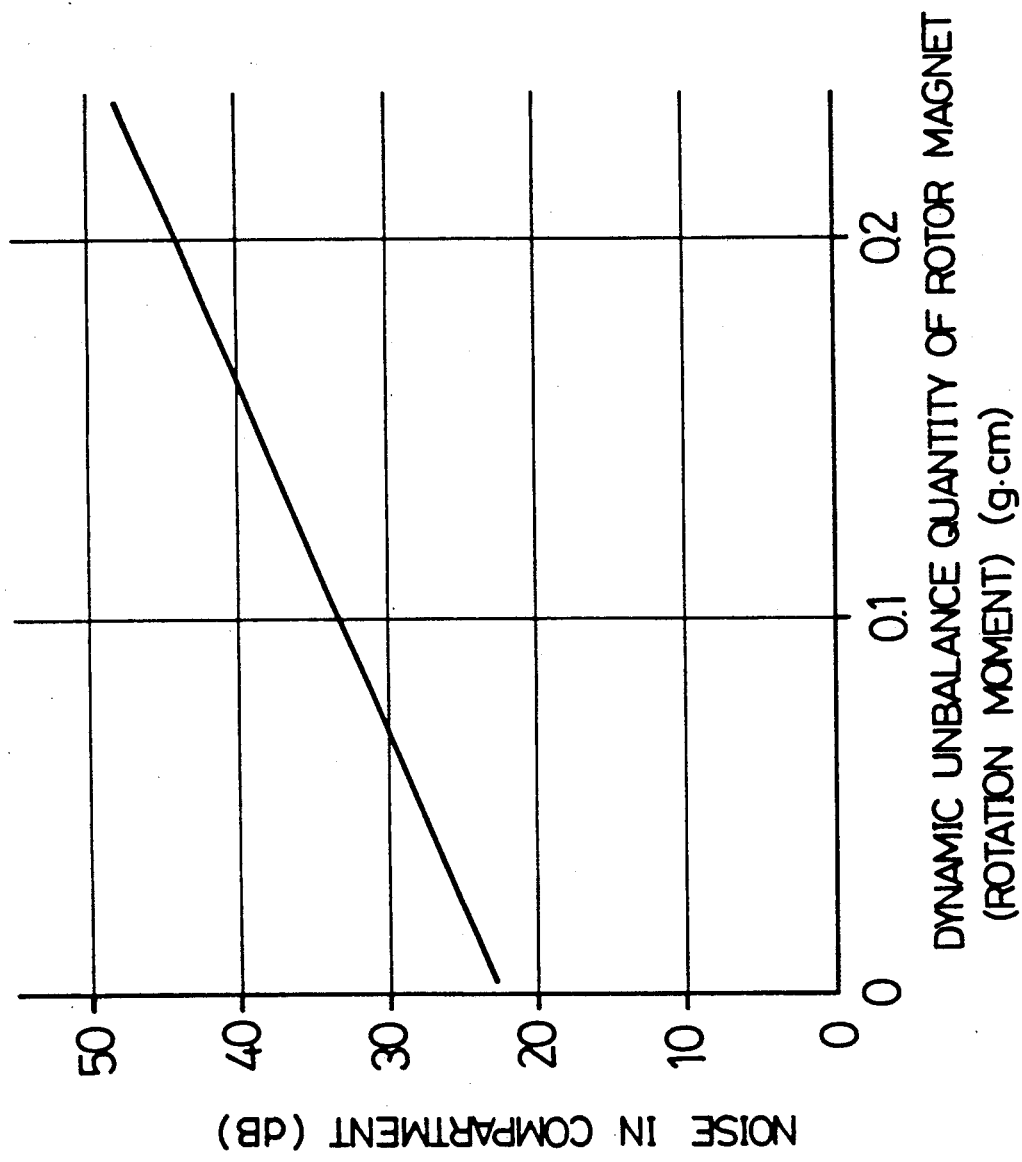
FIG. 6 is a graph showing the relationship between a dynamic unbalance quantity of a rotor magnet and a noise in an automobile compartment.

Referring to FIG. 5 which shows another modification of the rotor assembly 25, the collar 10 shown in FIG. 3A is removed, and the rotor magnet 11 is directly fixed to the motor shaft 9. With this construction, substantially the same effect as the previous preferred embodiment can be exhibited, and it is more advantageous that the structure is made simple.

Figure 7:
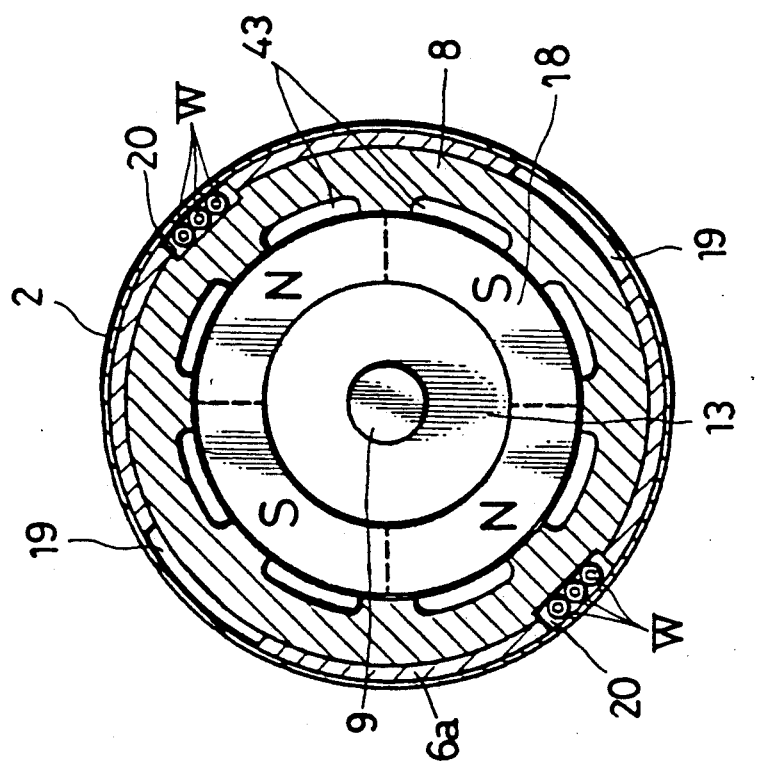
FIG. 7 is a cross section taken along the line A2—A2 in FIG. 1, showing a second preferred embodiment of the present invention.
Figure 8:
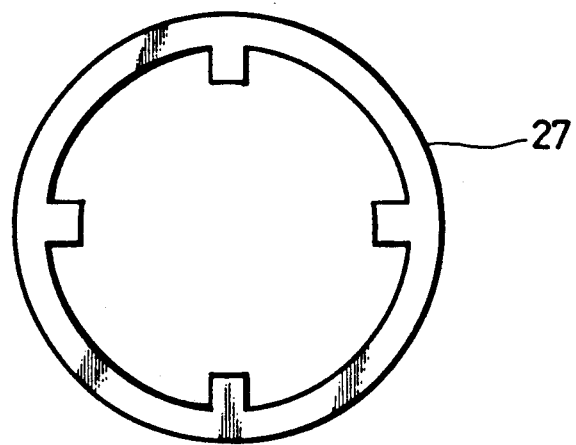
FIG. 8 is a right side view of the shim shown in FIG. 1.
Figure 9:
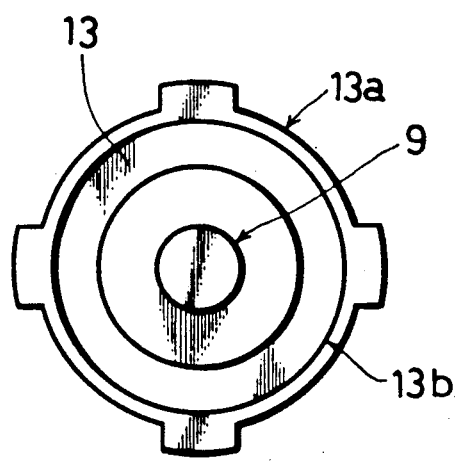
FIG. 9 is a right side view of the timing rotor shown in FIG. 1.
Figure 10:
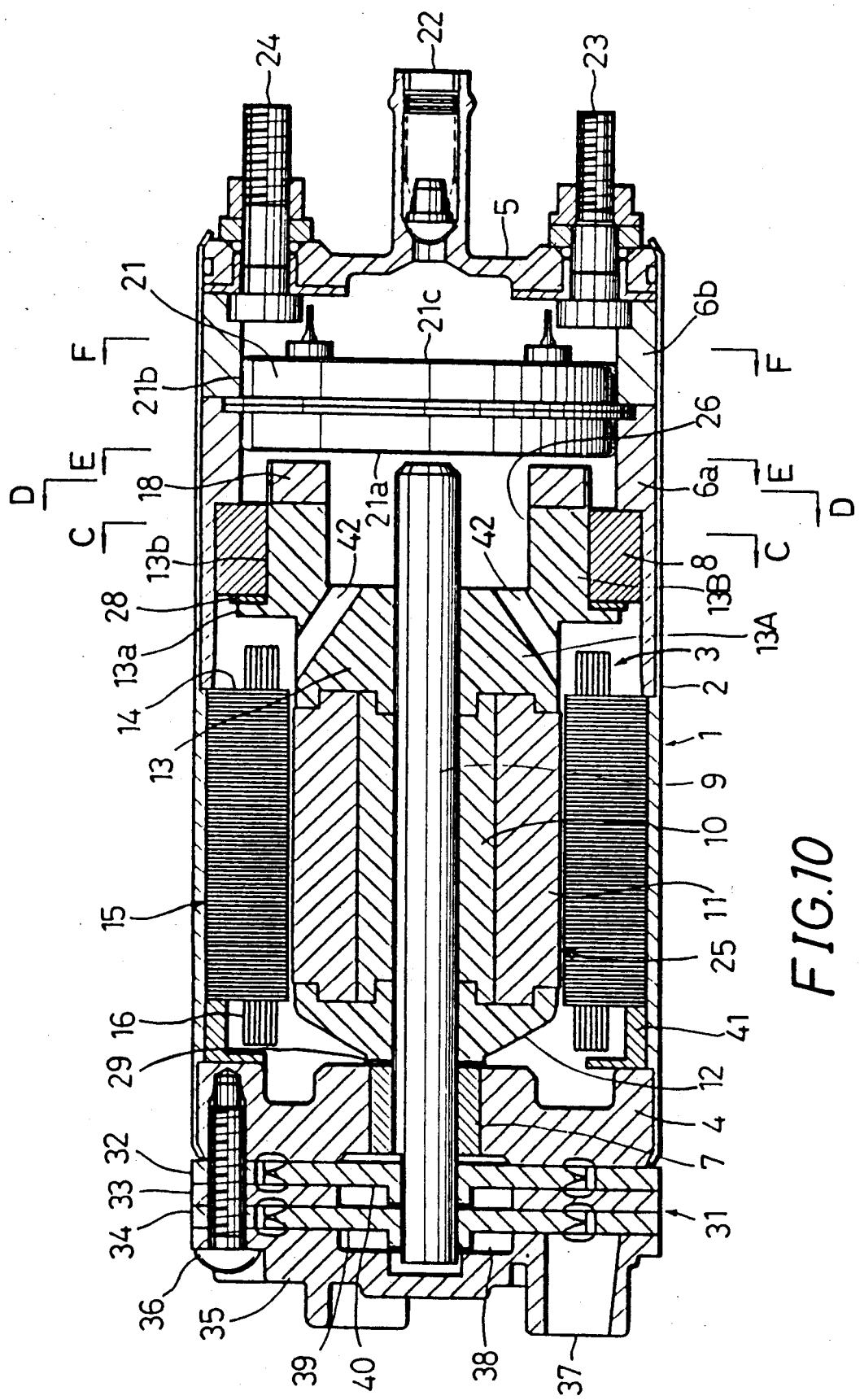
FIG. 10 is a vertical sectional view of a third preferred embodiment of the motor-driven fuel pump according to the present invention.
Figure 12:
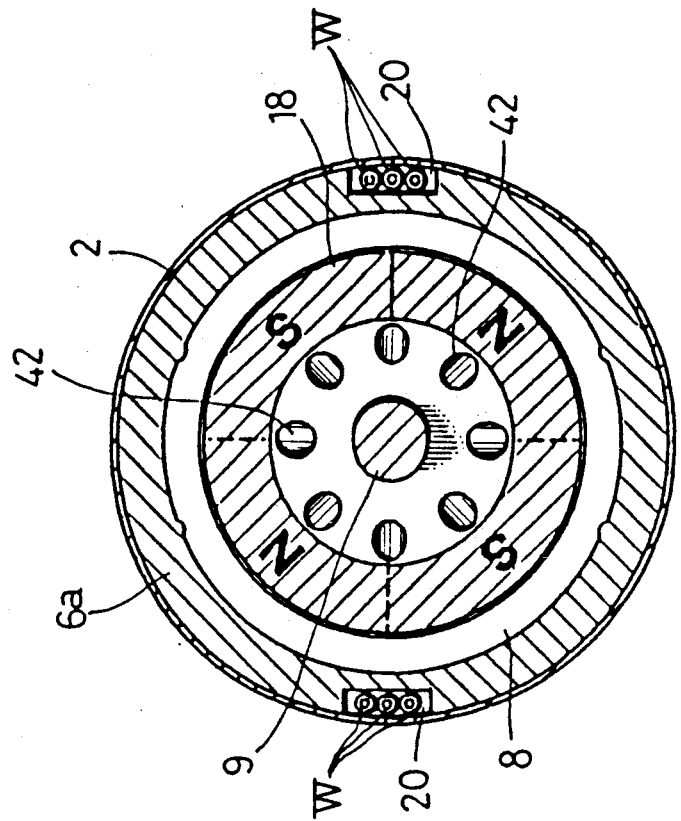
FIG. 12 is a cross section taken along the line D—D in FIG. 10.
Figure 11:
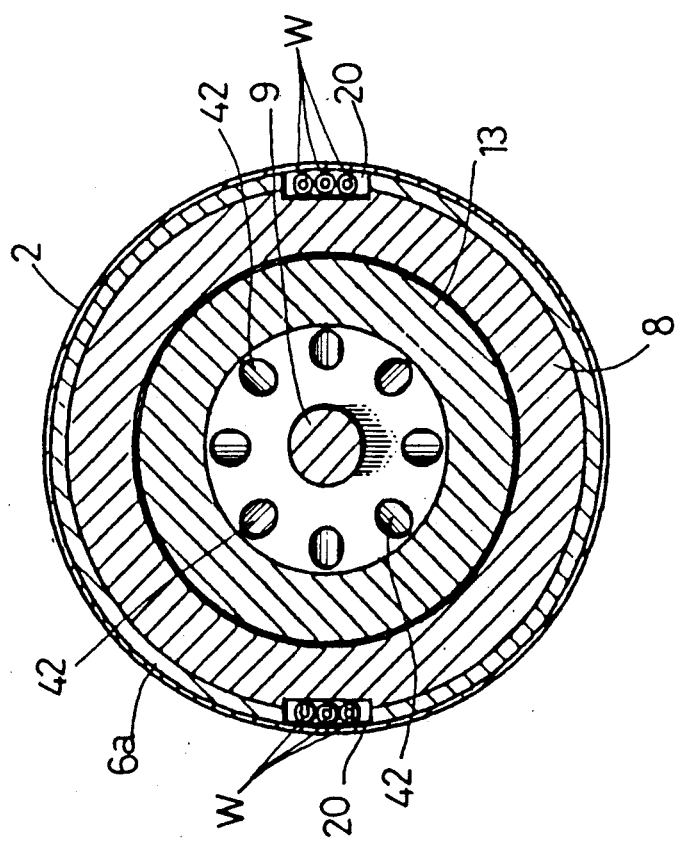
FIG. 11 is a cross section taken along the line C—C in FIG. 10.
Figure 13:
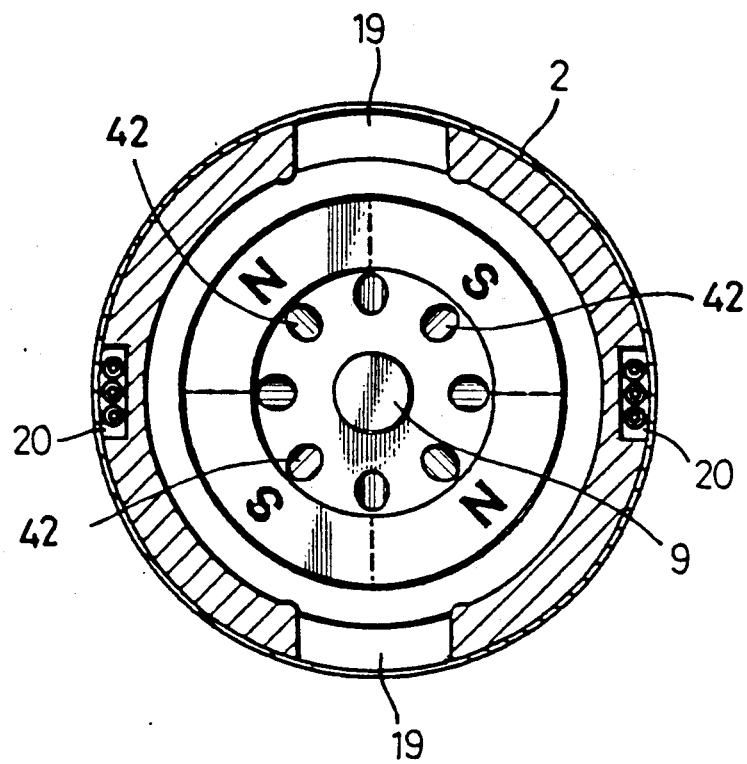
FIG. 13 is a cross section taken along the line E—E in FIG. 10.
Figure 14:
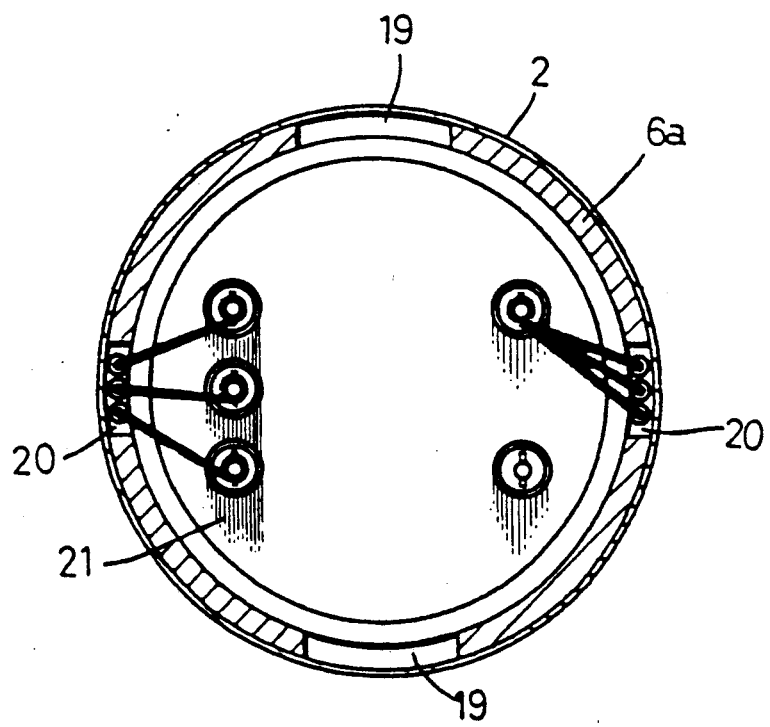
FIG. 14 is a cross section taken along the line F—F in FIG. 10.
Figure 15:
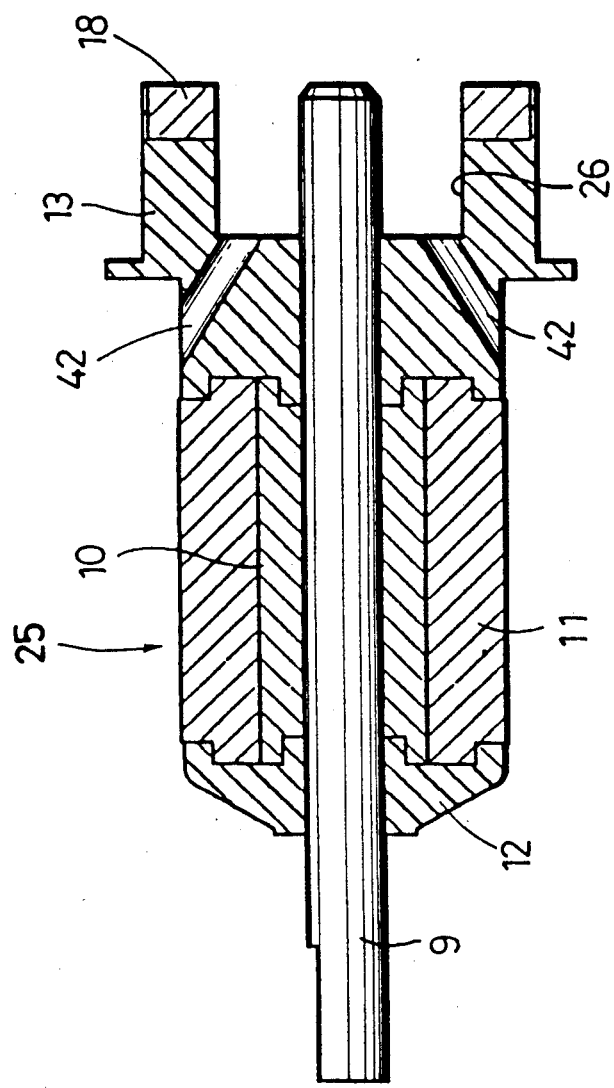
FIG. 15. is a vertical sectional view of the rotor assembly shown in FIG. 10.
Figure 16:
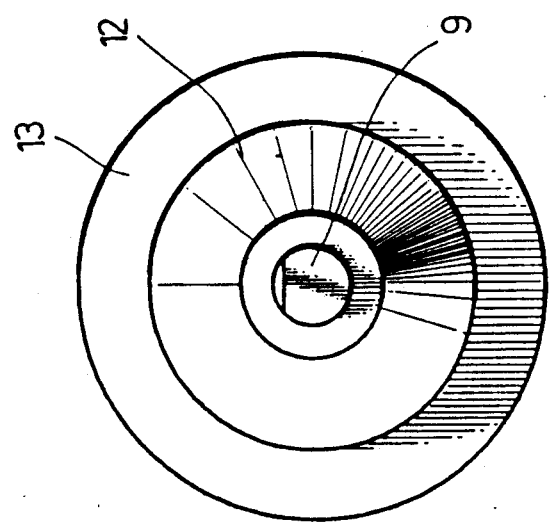
FIG. 16 is a left side view of FIG. 15.
Figure 17:
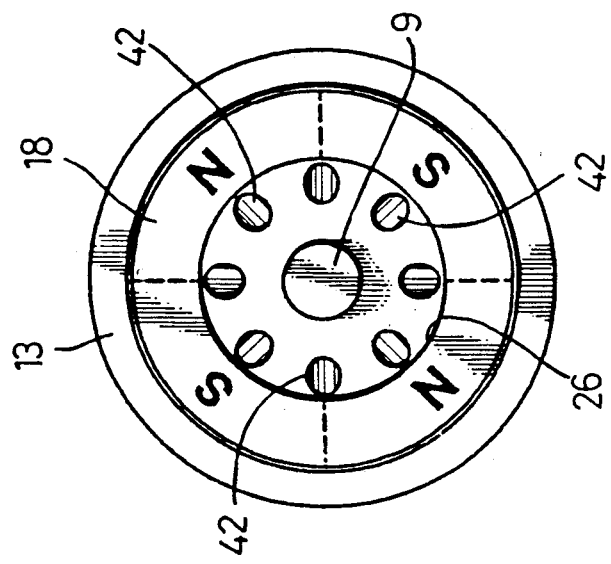
FIG. 17 is a right side view of FIG. 15.

Referring next to FIG. 7 which is a cross section taken along the line A2—A2 in FIG. 1 as well as FIGS. 8 and 9, showing a second preferred embodiment of the present invention, the timing rotor bearing 8 is formed at its inner circumference with a plurality of axially extending fuel channels 43 for communicating the fuel along the bearing surface 13d of the timing rotor 13. The other construction is the same as the construction of the first preferred embodiment shown in FIG. 1. In the operation of the motor-driven fuel pump, the fuel in the motor housing 2 is allowed to flow in the fuel channels 43 formed on the inner circumference of the timing rotor bearing 8 slidingly contacting the bearing surface 13d of the timing rotor 13. Accordingly, a frictional heat generated on the sliding contact surface between the bearing 8 and the timing rotor 13 is released by the fuel flowing in the fuel channels 43. That is, the sliding contact surface between the bearing 8 and the timing rotor 13 is cooled by the fuel flowing in the fuel channels 43 to thereby suppress thermal expansion of the bearing 8.

Referring next to FIGS. 10 to 17 which show a third preferred embodiment of the present invention, the timing rotor 13 is formed with a plurality of fuel passages 42. The other construction is the same as the construction of the first preferred embodiment. The same parts are designated by the same reference numerals, and the explanation thereof will be omitted. As shown in FIGS. 11 to 13 and 17, the fuel passages 42 are arranged concentrically about the motor shaft 9 at equally 45 degrees spaced apart from each other. The timing rotor 13 is formed with a sectionally U-shaped recess 26 inside the large-diameter portion 13B and the ring-like sensor magnet 18. Each of the fuel passages 42 is formed through the small-diameter portion 13A of the timing rotor 13 in such a manner as to extend straight and inclinedly from the outer circumference of the small-diameter portion 13A to the bottom surface of the recess 26. Accordingly, the fuel is allowed to flow through the fuel passages 42 to the recess 26 and strike against a surface 21a of the control circuit case 21 which surface is opposed to the rotor assembly 25.

The motor-driven fuel pump is disposed vertically in the fuel tank such that the discharge outlet 22 is directed upside. Accordingly, the left-hand surface 21a, a circumferential surface 21b and a right-hand surface 21c of the control circuit case 21 will be hereinafter referred to as a bottom surface 21a, a side surface 21b and a top surface 21c, respectively.

When the pump section 31 is driven by the brushless motor 3, the fuel is sucked from the fuel inlet 37, and is discharged under pressure from the fuel outlet of the pump section 31. Then, the fuel is fed around the rotor assembly 25 in the motor housing 2, and is allowed to flow through the fuel passages 42 of the timing rotor 13 to the bottom surface 21a of the control circuit case 21. Then, the fuel is fed through the fuel passages 19 of the case holders 6a and 6b around the side surface 21b of the control circuit case 21, and is then fed along the top surface 21c of the control circuit case 21. Finally, the fuel is discharged from the discharge outlet 22.

Accordingly, the overall outer surface of the control circuit case 21 is cooled by the fuel flowing around the case 21. Especially, since the fuel flowing through the fuel passages 42 strikes against the bottom surface 21a of the control circuit case 21, fuel vapor staying under the bottom surface 21 may be sufficiently removed by the flow of the fuel.

Although the number of the fuel passages 42 is not limited to the above preferred embodiment, it is preferred to provide at least two fuel passages in symmetrical relationship to each other with respect to the motor shaft 9, in consideration of the dynamic balance of the rotor assembly 25.

Figure 18:
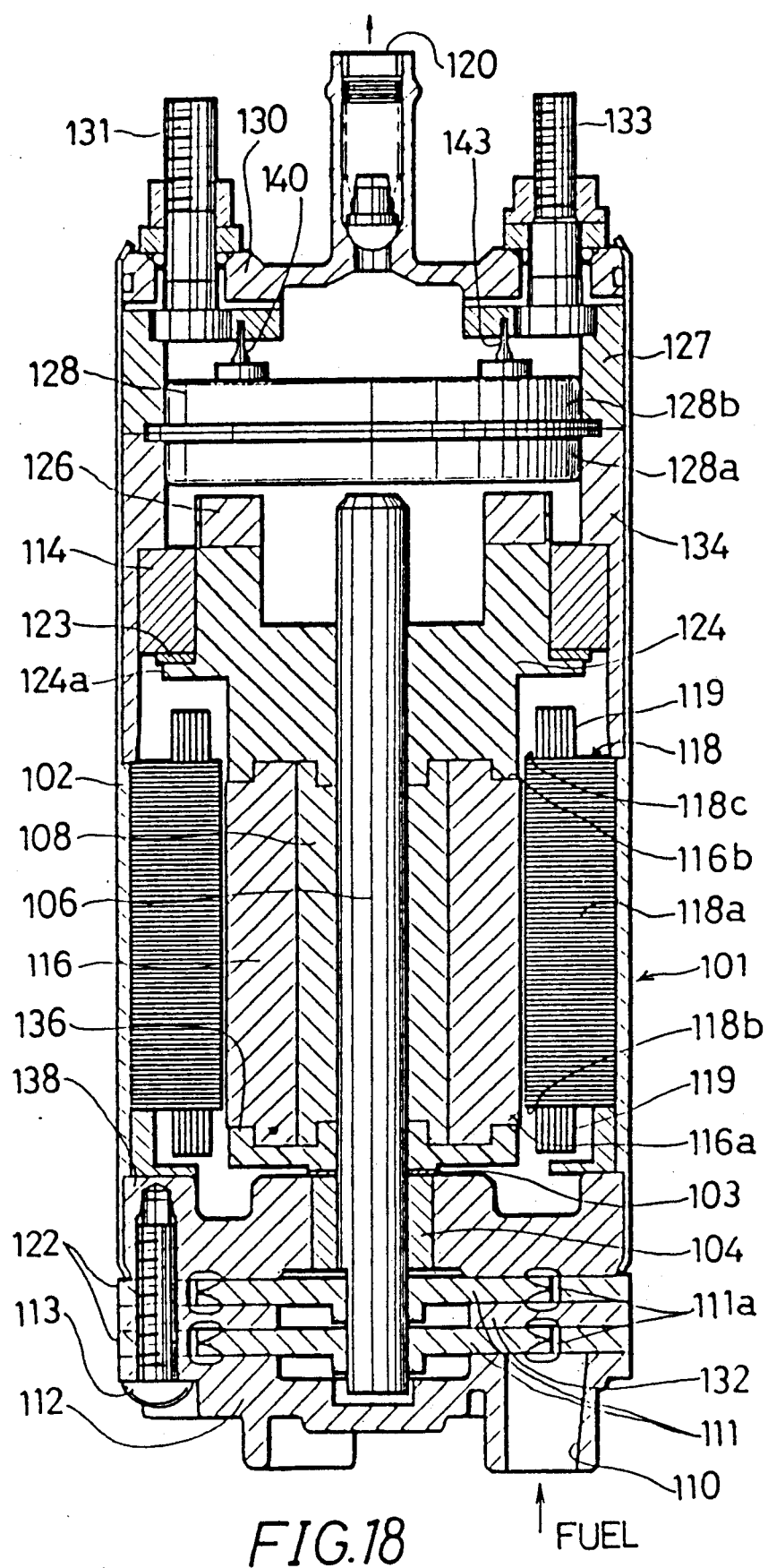
FIG. 18 is a vertical sectional view of a fourth preferred embodiment of the motor-driven fuel pump according to the present/invention.

Referring next to FIG. 18 which shows a fourth preferred embodiment of the present invention, reference numeral 101 generally designates a motor-driven fuel pump using a brushless motor. The fuel pump 101 is generally comprised of a pump section, a motor section for driving the pump section, and a control circuit section for controlling rotation of the motor. The pump section, the motor section and the control circuit section are assembled together through a motor housing 102 and screws 113. The fuel pump 101 is vertically located in a fuel tank (not shown) in such a manner that a fuel inlet 110 formed through a pump body 112 fixed to the pump section is opened in a direction where a gravitational force is applied, and that a fuel outlet 120 is opened in the opposite direction.

The pump section is provided at the lower end of the pump 101. The pump section is comprised of the pump body 112 having the fuel inlet 110, a pair of ring-like spacers 122, a center plate 132 interposed between the spacers 122, and a pump cover 138 having a fuel discharge opening (not shown). Further, a pair of impellers 111 are rotatably mounted at a lower end portion of a motor shaft 106, and they are interposed between the pump body 112 and the center plate 132 and between the center plate 132 and the pump cover 138. Each of the impellers 111 is formed at its outer circumference with a plurality of vanes 111a. A lower bearing 104 is mounted between the pump cover 138 and the motor shaft 106, and a shim 103 is mounted on the upper surface of the bearing 104.

The motor section is located at a substantially central portion of the pump 101. A cylindrical rotor magnet 116 formed of a permanent magnet having multiple poles is fixed through a cylindrical collar 108 to the motor shaft 106. A stator 118 is fixed to an inner circumference of the motor housing 102 in such a manner as to surround the rotor magnet 116. The stator 118 is constructed of a plurality of stacked ferromagnetic thin plates (e.g., silicon steel plates) 118a and a plurality of coils 119 wound around the thin plates 118a for exciting the same. As is apparent from FIG. 18, a lower end 116a of the side surface of the rotor magnet 116 opposed to the stator 118 is positioned at a level slightly lower than a lower end 118b of the stator 118. On the other hand, an upper end 116b of the side surface of the rotor magnet 116 is positioned at a level slightly lower than an upper end 118c of the stator 118. Accordingly, a magnetic attraction force is generated between the rotor magnet 116 and the stator 118 to thereby attract the rotor magnet 116 toward the stator 118. As a result, a rotor assembly including the rotor magnet 116 is upwardly attracted to the stator 118 by the magnetic attraction force as mentioned above. That is, a gravitational force due to the weight of the rotor assembly balances such an upward attraction force, so that no load may be applied to the upper end of the bearing 104 through the shim 103. Alternatively, the vertical position of the rotor magnet 116 relative to the stator 118 may be set in such a manner that a difference obtained by subtracting the upward attraction force from the weight of the rotor assembly may be applied to the bearing 104, thereby reducing the load to be applied through the shim 103 to the bearing 104.

A cover rotor 136 is fixed to the lower ends of the rotor magnet 116 and the collar 108 in opposed relationship to the bearing 104. A timing rotor 124 for adjusting balance of rotation of the rotor magnet 116 is fixed to the upper ends of the rotor magnet 116 and the collar 108. Further, a ring-like sensor magnet 126 is fixed to the upper end of the timing rotor 124. Thus, the rotor assembly is constructed of the rotor shaft 106, the collar 108, the rotor magnet 116, the rotor cover 136, the timing rotor 124 and the sensor magnet 126. A dynamic balance of the rotor assembly can be adjusted by cutting off a part of the inner or outer circumference of the timing rotor 124 or the outer circumference of the rotor cover 136. A holder 134 is fixed to the inner circumference of the motor housing 102 for holding an upper bearing 114 and a control circuit case 128. The holder 134 is formed with a plurality of fuel passages (not shown). The timing rotor 124 is formed at its outer circumference with a flange 124a, and a shim 123 is interposed between the bearing 114 and the flange 124a. Thus, vertical motion of the rotor assembly is restricted by the bearings 104 and 114 through the shims 103 and 113.

The control circuit section is located above the motor section. That is, the control circuit case 128 for enclosing a control circuit is held by the holder 134 and another holder 127 at a position opposed to the sensor magnet 126 and slightly apart therefrom. The control circuit case 128 is constructed by bonding an upper element 128a and a lower element 128b. Although not seen, the control circuit case 128 encloses a circuit board mounting thereon a position detecting device for detecting an angular position of the sensor magnet 126. Connection terminals 140 and 143 are mounted to the upper element 128b of the control circuit case 128, and they are connected to the coils 119 and external power supply terminals 131 and 133 fixed to the upper pump cover 130.

In operation, when the pump 101 is supplied with current, an angular position of the rotor magnet 116 is precisely detected through the sensor rotor 126 by means of the position detecting device in the control circuit case 128. Then, an exciting current is supplied to the coils 119 of the stator 118 to thereby generate a magnetic flux in the stator 118. As a result, the rotor magnet 116 is rotated, and the impellers 111 are simultaneously rotated. By the rotation of the impellers 111, there is generated swirl at the vanes 111a of the impellers 111 to increase a fuel pressure in the pump section. Thus, the fuel having an increased pressure is fed through the fuel passages in the motor housing 102, and is discharged from the fuel outlet 122.

According to the construction of the motor section such that the rotor magnet 116 is downwardly shifted from the stator 118, the load of the rotor assembly to be applied to the bearing 104 and the shim 103 is nullified or reduced by the upward attraction force due to the magnetic attraction force generated between the rotor magnet 116 and the stator 118. Accordingly, wearing of the upper end surface of the bearing 114 may be greatly reduced, thereby preventing a reduction in durability of the bearing 114 and an adverse effect due to wearing powder. Resultantly, the durability of the pump 101 may be improved.

Further, by selecting the thicknesses of the shims 103 and 123, a gap between the sensor magnet 126 and the control circuit case 128 may be precisely adjusted to thereby improve the sensitivity of the position detecting device in the control circuit case 128.

Figure 19:
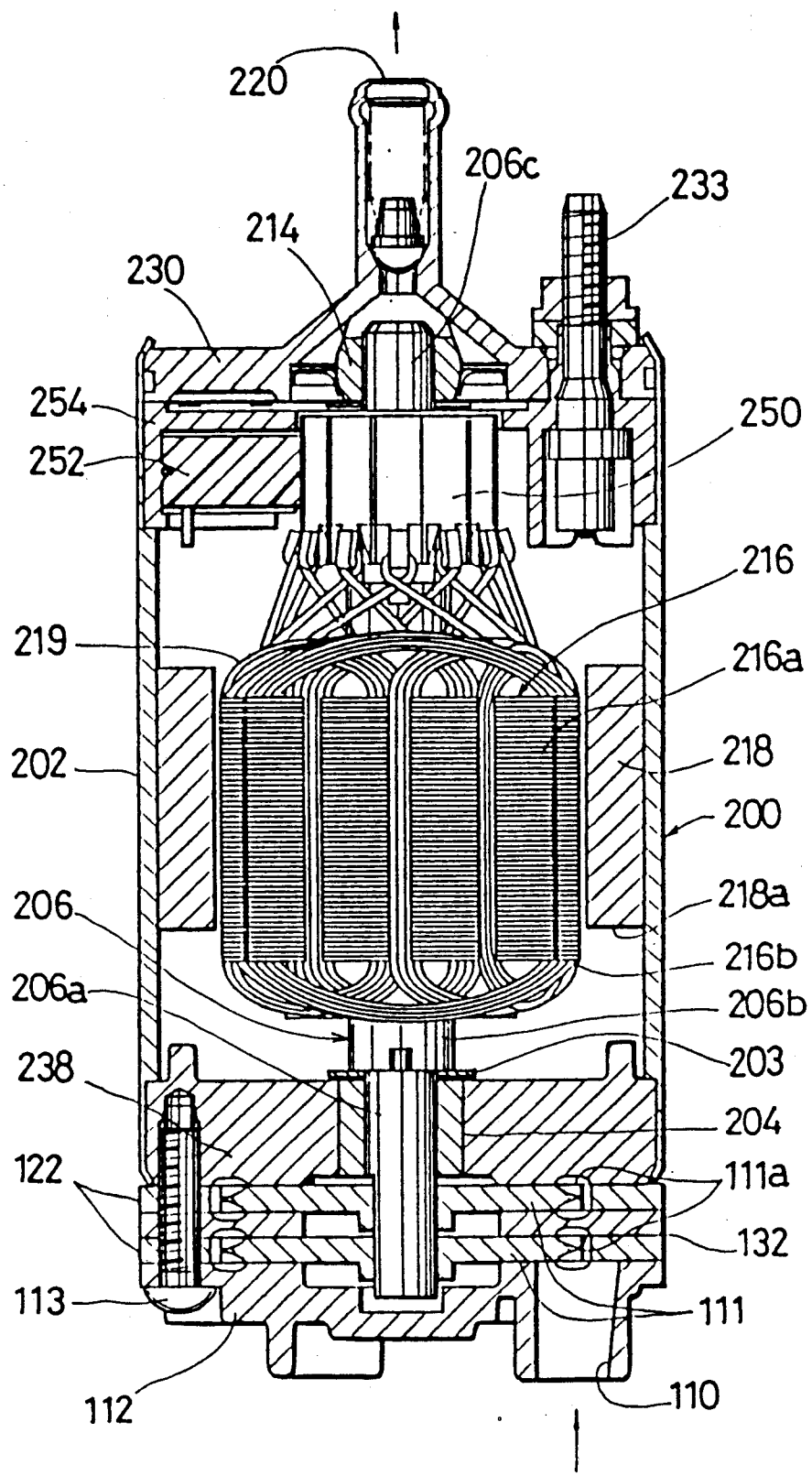
FIG. 19 is a view similar to FIG. 18, showing a modification of the fuel pump.

Referring to FIG. 19 which shows a fifth preferred embodiment of the present invention, reference numeral 200 generally designates a motor-driven fuel pump using a brush DC motor, wherein the same parts as in FIG. 18 are designated by the same reference numerals, and the explanation thereof will be omitted. Similarly, the pump 200 is vertically located in a fuel tank (not shown) in such a manner that the fuel inlet 110 is opened in a direction where a gravitational force is applied.

A motor shaft 206 is constructed of three elements 206a, 206b and 206c connected together, and these elements are rotated simultaneously. A lower bearing 204 is mounted between the shaft element 206a and a pump cover 238, and a shim 203 is interposed between the shaft element 206b and the lower bearing 204. A core 216 corresponding to the rotor magnet 116 shown in FIG. 18 is fixed to the shaft element 206b. The core 216 is constructed of a plurality of stacked ferromagnetic thin plates 216a and a plurality of coils 219 wound around the thin plates 216a for generating a magnetic flux upon excitation. A stator 218 formed of permanent magnet is fixed to the inner circumference of the motor housing 202 in such a manner as to substantially surround the core 216.

A commutator 250 is fixed to the shaft element 206c, and a brush 252 is provided to contact the commutator 250. The brush 252 is held by a holder 254 fixed to the motor housing 202. An upper bearing 214 is provided between the shaft element 206c and an upper cover 230. The upper cover 230 is formed with a fuel outlet 220, and is provided with a power supply terminal 233 electrically connected to the brush 252.

Also in this preferred embodiment, the core 216 is downwardly shifted from the stator 218 so that the former may be upwardly attracted to the latter by a magnetic attracting force generated therebetween to thereby nullify or reduce the load of a rotor assembly including the core 216 to be applied to the lower bearing 204. That is, a lower end 216b of the core 216 is positioned at a level slightly lower than a lower end 218a of the stator 218. Accordingly, substantially the same effect as the preferred embodiment shown in FIG. 18 may be exhibited.

Having thus described the preferred embodiments of the invention, it should be understood that numerous structural modifications and adaptations may be made without departing from the spirit of the invention.

What is claimed is:

1. A motor-driven fuel pump comprising:
a brushless motor;
a motor housing for enclosing said brushless motor; and
a pump section adapted to be driven by said brushless motor for sucking a fuel and pumping the same into said motor housing;
said brushless motor comprising:
a stator fixed to an inner circumference of said motor housing;
a rotor assembly adapted to be rotated by supplying current to said stator, said rotor assembly comprising a motor shaft, a rotor magnet mounted to said motor shaft, a rotor cover mounted to one end of said rotor magnet on the side of said pump section, a timing rotor mounted to the other end of said rotor magnet, and a sensor magnet mounted to an end of said timing rotor on the side opposite to said rotor magnet;
an end cover mounted at an inlet end of said brushless motor;
a motor shaft bearing mounted in said end cover for rotatably supporting said motor shaft; and
a timing rotor bearing interposed between an outer circumference of said timing rotor and the inner circumference of said motor housing for rotatably supporting said timing rotor.

2. The motor-driven fuel pump as defined in claim 1, wherein said rotor assembly further comprises a collar fixedly mounted on said motor shaft.

3. The motor-driven fuel pump as defined in claim 2, wherein said rotor magnet is engaged on an outer circumference of said collar and is bonded thereto by adhesive.

4. The motor-driven fuel pump as defined in claim 2, wherein the opposite ends of said rotor magnet is formed at their outer circumferences with first and second annular recesses, while said rotor cover is formed at its outer circumference with an annular projection engaging said first recess of said rotor magnet, and said timing rotor is formed at its outer circumference with an annular projection engaging said second recess of said rotor magnet.

5. The motor-driven fuel pump as defined in claim 4, wherein the opposite ends of said collar is formed at their inner circumferences with first and second annular recesses, while said rotor cover is formed at its inner circumference with an annular projection engaging said first recess of said collar, and said timing rotor is formed at its inner circumference with an annular projection engaging said second annular recess of said collar.

6. The motor-driven fuel pump as defined in claim 2, wherein said collar, said rotor cover and said timing rotor are press-fitted with said motor shaft, and said rotor cover and said timing rotor are bonded to the opposite ends of said rotor magnet and said collar.

7. The motor-driven fuel pump as defined in claim 1, wherein said sensor magnet and said rotor magnet have magnetic poles so arranged as to accord with each other in phase.

8. The motor-driven fuel pump as defined in claim 2, wherein said collar and said rotor cover are press-fitted with said motor shaft, and said timing rotor is press-fitted with said collar.

9. The motor-driven fuel pump as defined in claim 1, wherein said rotor magnet is fixed on said motor shaft, and said rotor cover and said timing rotor are press-fitted with said motor shaft.

10. The motor-driven fuel pump as defined in claim 1, wherein said timing rotor bearing is formed at its inner circumference with a plurality of axially extending fuel channels for communicating the fuel therethrough in said motor housing, whereby a frictional heat generated from said timing rotor bearing is reduced by the fuel flowing in said fuel channels.

11. The motor-driven fuel pump as defined in claim 1 further comprising a control circuit case for enclosing a control circuit for detecting a magnetic field to be generated by said sensor magnet and controlling supply of current to said stator, said control circuit case being fixedly disposed in said motor housing in the vicinity of and in opposed relationship to said sensor magnet, and a fuel passage formed through said rotor assembly in such a manner as to lead the fuel to an outer surface of said control circuit case opposed to said sensor magnet, whereby said control circuit case is cooled by the fuel fed through said fuel passage.

12. The motor-driven fuel pump as defined in claim 11, wherein said fuel passage comprises at least two fuel passages formed through said timing rotor in symmetrical relationship to each other with respect to said motor shaft.

13. The motor-driven fuel pump as defined in claim 12, wherein said timing rotor is formed with a recess to be opposed to said outer surface of said control circuit case, and said fuel passages extends straight and inclinedly from the outer circumference of said timing rotor to an inner surface of said recess.

14. A motor-driven fuel pump comprising:
a motor housing;
a motor section having a motor shaft extending in a direction of gravity, a rotor fixedly mounted on said motor shaft and a stator fixed to an inner circumference of said motor housing;
a pump section adapted to be driven by said motor section for sucking a fuel and pumping the same into said motor section; and
upper and lower bearings for rotatably supporting said rotor at its upper and lower end portions;
wherein an outer circumferential surface of said rotor is opposed to an inner circumferential surface of said stator, and a lower end of the outer circumferential surface of said rotor is positioned at a level lower than a lower end of the inner circumferential surface of said stator, so that said rotor is upwardly attracted by a magnetic attracting force generated between said rotor and said stator to reduce a load to be applied from said rotor to said lower bearing.

15. The motor-driven fuel pump as defined in claim 14, wherein said motor section comprises a brushless motor having a rotor magnet constituting said rotor.

16. The motor-driven fuel pump as defined in claim 14, wherein said motor section comprises a brush DC motor having a core constituting said rotor.

* * * * *